(12) United States Patent
Rothschild

(10) Patent No.: US 7,318,061 B2
(45) Date of Patent: Jan. 8, 2008

(54) MEDIA VALIDATION AND REGISTRATION SYSTEM

(75) Inventor: Leigh M. Rothschild, Plantation, FL (US)

(73) Assignee: Rothschild Trust Holdings, LLC, Sunny Isles Beach, FL (US)

( * ) Notice: Subject to any disclaimer, the term of this patent is extended or adjusted under 35 U.S.C. 154(b) by 196 days.

(21) Appl. No.: 11/255,844

(22) Filed: Oct. 21, 2005

(65) Prior Publication Data

US 2006/0036611 A1 Feb. 16, 2006

Related U.S. Application Data

(63) Continuation-in-part of application No. 11/226,561, filed on Sep. 14, 2005, which is a continuation of application No. 10/178,041, filed on Jun. 21, 2002, now Pat. No. 6,952,697.

(51) Int. Cl.
*G06F 17/30* (2006.01)

(52) U.S. Cl. .................. 707/9; 707/2; 707/6; 707/8; 707/10

(58) Field of Classification Search ............. 707/1–10, 707/100–104.1, 200–206
See application file for complete search history.

(56) References Cited

U.S. PATENT DOCUMENTS 6,978,021 B1 * 12/2005 Chojnacki .................... 705/51

* cited by examiner

*Primary Examiner*—Isaac Woo
(74) *Attorney, Agent, or Firm*—Anthony J. Casella; Gerald E. Hespos

(57) ABSTRACT

A media validation and registration system includes media storage devices which contain a quantity of content thereon, a user computer processor assembly structured to access a select media storage device, a verification module, and a communicative link between the verification module and the user computer processor assembly. Each media storage device includes a unique unit identifier, the verification module identifying the unique unit identifier of the select media storage device and receiving user information associated therewith. The verification module is also structured to apply supplemental content in association with a first user whose user information is associated with the unique unit identifier for the select media storage device, and to allow the user to register the media storage device through a computer network, e.g., the Internet, and also to verify the status of the registration by going to a website of the publisher or distributor of the media storage device.

16 Claims, 2 Drawing Sheets

MEDIA VALIDATION AND REGISTRATION SYSTEM

PRIORITY

The present application is a continuation-in-part application of U.S. patent application Ser. No. 11/226,561, filed Sep. 14, 2005, which is a continuation application of Ser. No. 10/178,041, filed Jun. 21, 2002, now U.S. Pat. No. 6,952,697, which issued on Oct. 4, 2005, the contents of which are hereby incorporated by reference in their entirety.

BACKGROUND OF THE INVENTION

1. Field of the Invention

The present invention relates to a media validation and registration system which can be utilized in association with any of a variety of types of media storage devices including DVD's and CD's, the validation/registration system associating a user reward aspect in a manner which will require validation/registration of an appropriate media storage device to obtain the reward, and in a manner which provides a disincentive to an original purchasing user to make or allow unauthorized copies and/or duplication of their media storage device, as that will jeopardize their reward benefit on an ongoing basis. Furthermore, the present validation/registration system provides access to supplemental content, which may or may not comprise the reward, thereby providing a further incentive to consumers to purchase authorized media storage devices to gain access to the rewards, including possibly the access to the supplemental content which may reside on a remote server that upon validation/registration transmits the content to a user computer processor assembly through a computer network, e.g., the Internet. The present validation/registration system also describes a system and method of enabling users to register their media storage devices.

2. Description of the Related Art

In the software and entertainment industry, a substantial source of revenues comes from the actual sale of media content to consumers. This content may include audio only content, such as in the form of music, readings, games, etc., visual only content, such as including textual matters, or, as is becoming more common given the advances in technology, a combination of audio and video content. To effectively deliver the media content to consumers, media storage devices are typically employed to contain at least a substantial portion of the content. Furthermore, as technology advances, new and increasing types of media storage devices are being made available so as to enhance either storage capacity and/or quality of the delivery of the media content. Moreover, the media storage devices are often provided in a substantially compact and interchangeable fashion such that consumers may access the media content in any of a variety of locations, such as in an office computer, in a home computer, in a car, in a home entertainment system, etc. Further, many of the available media storage devices are capable of being connected to computer devices that are in turn connected to the Internet, e.g., an iPod™, or even directly to the Internet via a wireless connection, e.g., a Wi-Fi-enabled Pocket PC™.

Unfortunately, along with the advances that result in the field of storage devices, many advances have also come about with regard to means for copying the content from one media storage device to another. For example, most computers now commonly include CD and DVD copying hardware (e.g., CD and DVD burners), which in addition to the legitimate purpose of permitting consumers to make back-up copies of their data and media content for personal use, is also permitting users to make copies of various different types of media storage devices, including for example music CDs, movie DVDs, and/or CD-ROMs and/or games and game cartridges, etc., and providing them to other users, thereby avoiding the need for the other users to buy their own legitimate copy of the media content. Furthermore, in addition to CD's and CD-ROMs, many of which contain audio and video content, DVDs are becoming a very popular and very profitable type of media storage device utilized to provide high quality media content to users. Also, as can be appreciated, DVD copying devices and/or DVD copying software which copies a DVD's content to a CD-ROM or other device are becoming increasingly prevalent, and despite attempts at encryption of the DVD's and/or other encoding, the copying of DVD's, either onto another DVD or onto a CD-ROM is becoming increasingly facilitated thus, providing another source to circumvent the need to purchase the media content, while still obtaining substantially the same high quality as the original media storage device. Also, as such copying devices generally make substantially complete duplication of the content of a media storage device, even supplemental content and information which are now being provided on a variety of media storage devices so as to provide consumer incentives for purchase of the media storage device, are also being copied. Accordingly, this additional content provides an incentive for an initial purchaser of the media storage device, however, copyists who may have an increased desirability for the media storage device because of the additional content are not required to purchase an original based on the ability of the copying facilities.

As a result, it would be substantially beneficial to provide a media verification and registration system which can provide consumers with substantial incentives to purchase their own media storage device containing the originally purchased media content, but will also provide a strong disincentive to the original purchaser to make or allow others to copy the content of their media storage devices. Furthermore, such a system should help promote the sales of the media storage device, enhancing its attractiveness to consumers, and providing an additional marketing tool by which producers or distributors of the media storage devices, and especially the content thereon, can identify consumers and link them through a computer network, e.g., the Internet, to the producer's or distributor's website where further information and content can be provided for the user and wherein the producer or distributor can target the users with advertising, and further promotions or registrations.

SUMMARY OF THE INVENTION

The present invention relates to a media validation and registration system. In particular, the present media validation and registration system includes a plurality of media storage devices each containing a quantity of content thereon. This content can be audio only, video only, audio/video, or any other type of content which consumers wish to purchase and/or utilize. Furthermore, the present system includes at least one user computer processor assembly that is structured to operatively access a select media storage device, preferably belonging to the user. In addition, the user computer processor assembly may include a communications device to allow communications to and through various computer networks, e.g., the Internet.

A verification module is also provided, and is communicatively associated with the user computer processor assembly, preferably via communicatively link therebetween. Of course, the communicative link can be a direct link and/or can be a link via another local or remote computerized network, including the Internet.

Each of the media storage devices includes a unique unit identifier. Moreover, the verification module is structured to identify the unique unit identifier of the select media storage device being accessed/utilized by the user computer processor assembly. The verification module is also structured to receive user information associated with the select media storage device having the unique unit identifier, maintaining that user information in association with the unique unit identifier for the select media storage device, and applying a reward credit in association with the user. The verification module, however, only provides the credit in association with a first user who's user information is associated with the unique unit identifier for the select media storage device, and as a result, users who are not the original purchasers of the media storage device will not be given the reward credit.

Furthermore, the media validation and registration system will enable a first user to register with a remote server website of the publisher or distributor of the media storage device, then allow the first user to go back to the designated Internet website of the distributor or publisher of the media storage device and check on the registration status of the media storage device, or register other media storage devices. Additionally, the media validation and registration system may allow subsequent users, i.e., not the original purchaser, to register for access to supplemental content in exchange for identification information of the subsequent user, e.g., a valid e-mail address.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
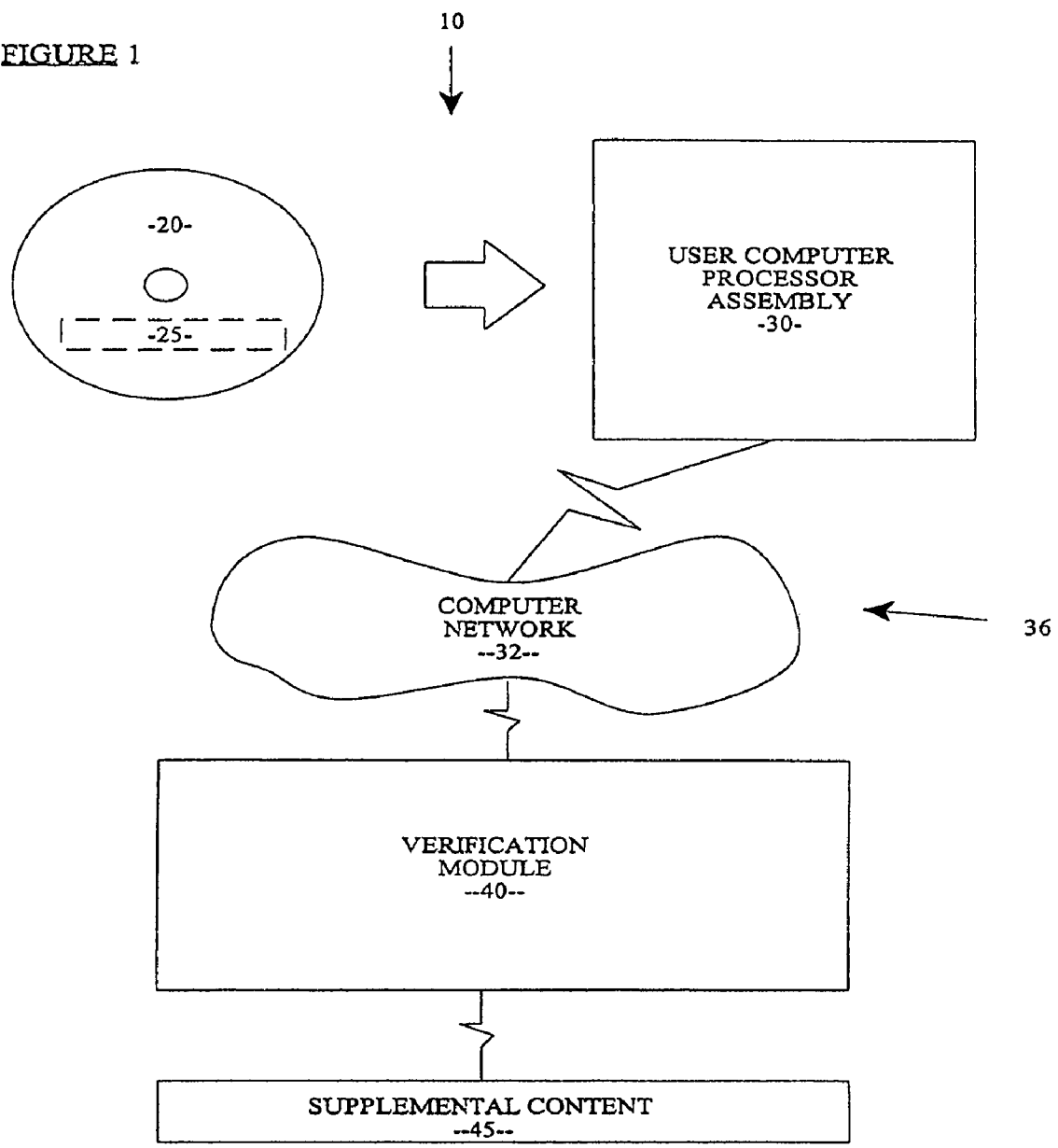
FIG. 1 is a schematic representation of one embodiment one of the media validation system of the present invention.
Figure 2:
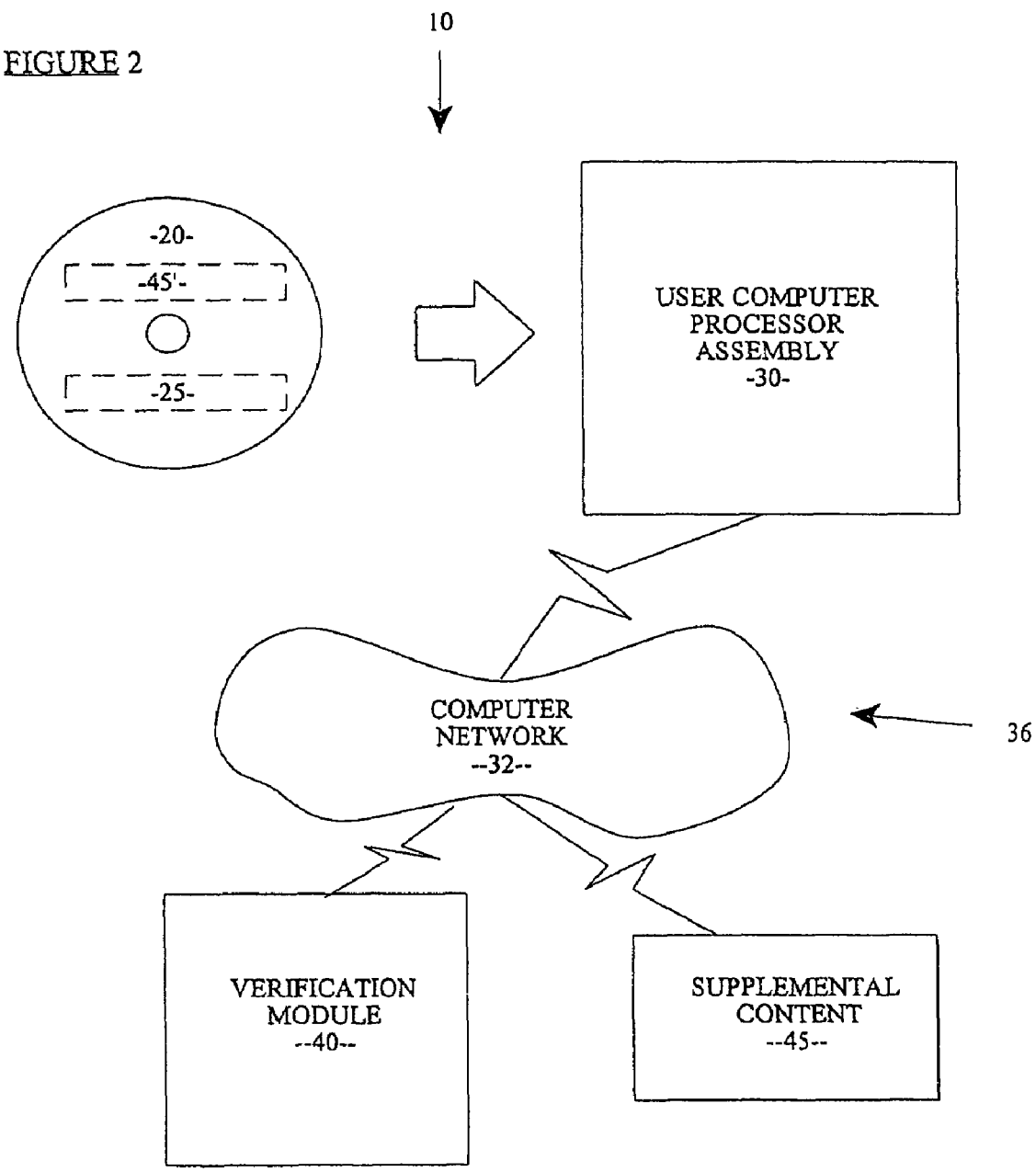
FIG. 2 is a schematic representation of yet another embodiment of the media validation system of the present invention.

Shown throughout the Figures, the present invention is directed towards a media validation and registration system, generally indicated as 10. In particular, the media validation and registration system 10 is structured to validate the authenticity of a media storage device containing a quantity of media content thereon, in a manner which will not hinder and/or impede the legitimate purchaser's use of the media storage device, and will provide them with enhanced benefits, while providing a disincentive to copying. As a result, the present media validation and registration system 10 includes a plurality of media storage devices, each storage device generally indicated by reference numeral 20. Each of the media storage devices is structured to contain a quantity of content thereon, preferably in a generally conventional fashion. As a result, the media storage device may include any of a variety of available and to be developed media storage devices, including compact disks (CDs), CD-ROMs, DVDs, chip-based storage devices, such as smart cards, memory cards including Memory Sticks™, SD memory, xD memory, Compact Flash memory, among others, and sim chips and RAM memory cards, mini disks, portable hard drive type storage devices, etc. Similarly, the content to be contained thereon may be identical on a number of storage devices, and can include audio or visual only content and/or a combination of audio and visual content such as in the form of movies, music, documents, software, games, etc. in any of the widely accepted formats whether compressed, uncompressed, encoded, etc.

In addition to the media storage device(s) 20, the present media validation system 10 also preferably includes a user computer processor assembly, generally 30. The user computer processor assembly 30 may include a standard personal, desk top computer, lap top computer, terminal, workstation, handheld device, including PDAs, satellite or cable box or personal video recorders, telephones, etc., and/or an enhanced media player, such as an enhanced CD player, DVD player, etc. In this regard, the user computer processor assembly 30 is preferably structured to at least be capable of operatively accessing a select media storage device of a user, which will be the subject of validation. The user computer processor assembly may include a communications device that may be connected through communications protocols including TCP/IP, etc. to the Internet. As a result, the computer processor assembly may receive and/or access the media storage device by a remote connection, a wireless or wired connection and/or in the case of CD-ROM's and/or DVD ROM's may be configured to merely receive and/or interact with the media storage device utilizing a corresponding drive or access assembly.

The present media validation system 10 further includes a verification module, generally 40. The validation/verification module 40 is preferably, but not necessarily remote from the user computer processor assembly 30, and may be defined by or on a remote, local or integrated computer processor assembly. Preferably, however, a communicative link 36, whether external or internal, is further provided and structured to communicatively link the verification module and the user computer processor assembly that is operatively accessing the select media storage device.

In the case of a remote verification module 40, the communicative link 36 may be established via a computer network 32 connection, such as the Internet, and/or via a direct or local network connection. As a result, appropriate interaction, at least in connection with validation of the select media storage device 20, can be achieved. Of course, it is recognized that this interaction via the communicatively link 36 may include the transmission of information between the user computer processor assembly 30 and the verification module 40, and/or the remote access of the select media storage device 20 by the validation/verification module 40, either directly and/or by directing the actions of the user computer processor assembly immediately or at a later time.

Looking in further detail to the media storage device 20, each media storage device preferably includes a unique unit identifier 25 associated therewith. This unique unit identifier 25 may comprise any form of identifier, including alphanumeric identifiers, encoded identifiers, etc. which will give the media storage device its own unique identity. For example, in the case of an alphanumeric type of unique unit identifier, the unique unit identifier 25 may be associated with the specific content on the particular media storage device, thus allowing the same alphanumeric entry to be utilized for other media storage devices containing different content and still be a unique unit identifier. Of course, if desirable in some circumstances, the same unique unit identifier may be utilized for a plurality of media storage devices. Nevertheless, in the illustrated embodiment the unique unit identifier included for each media storage device will not be duplicated such that each selected media storage device can be individually identified. Furthermore, it is preferred that this unique unit identifier be appropriately associated with the content on the media storage device, such that a copy of the content to another media storage device will also copy the unique unit identifier therewith, and accessing that copy of a selected media storage device will result in identification of the same unique unit identifier. In this regard, the verification module 40 is structured to identify the unique unit identifier of the select media storage device via the communicative link 36. In doing so, the verification module 40 may directly access the selected media storage device 20 and/or may instruct the user computer processor assembly 30 to access the selected media storage device and retrieve, for identification, the unique unit identifier 25 therefore. Furthermore, upon access of the media storage device, the user computer processor assembly may read the unique unit identifier and store the unique unit identifier in a memory associated or coupled to the user computer processor assembly.

The verification module 40 is further structured to receive user information in association with the selected media storage device having the unique unit identifier. This user information may include any of a variety of types of information, including a users name or a random or anonymous user ID, however, in the preferred embodiments the user information will be information that can be utilized so as to effectively identify a particular user in connection with the present media validation system 10, as well as in connection with other promotional and/or informational matter, and/or access to supplemental content as will be described. For example, a user name and e-mail address may be appropriate in some circumstances. Furthermore, an appropriate cookie or other identifier may be provided so as to facilitate future, manual or automatic identification of the user, such as in connection with inquiries and/or other, different media storage devices. The verification module 40, either directly and/or via an associated computer processor assembly may also maintain this user information in association with the unique unit identifier, and therefore the select media storage device, storing it for later reference and/or utilization. Still further, the user computer processor assembly may store this user information in association with the unique unit identifier in its memory.

The verification module is additionally structured to apply a reward credit in association with a user whose user information is associated with the unique unit identifier for the select media storage device. Moreover, this reward credit is preferably applied only in connection with the first user. Looking further to the reward credit, this may be provided in any of a number of different formats. For example, in some embodiments of the present invention the reward credit may include an identified validation of the specific user so as to provide them with access to supplemental content, either on the select media storage device itself and/or at another location, such as via a download and/or on another accessible server perhaps in the form of a website. Further, in one illustrated embodiment the reward credit may include the application of points and/or a value in association with the specific user, the points and/or value being utilized for the receipt of a further benefit. For example, the reward credit may be a series of points and/or dollar value credits which may be summed in association with a particular user for a variety of different media storage devices legitimately owned or purchased by the particular user, and once the total reward credit reaches a certain quantity, the user may be eligible for additional products, services, etc. As a result, a purchaser of the select media storage device will have a substantial incentive to validate their select media storage device, even if the content may be substantially available without validation, as this reward credit will be provided as a result of that validation process. Furthermore, consumers will be provided with a substantial incentive to purchase their own media storage device with its unique unit identifier, rather than making a copy of another, as only the first user to validate the selected media storage device will receive the reward credit. Naturally, as a particular user purchases more media storage devices and effectively validates them, the overall reward credit for them can increase, either permanently or until used or redeemed by the user.

In another embodiment, the verification module may verify the media storage device and then allow the user computer processor assembly to connect to a remote server through a computer network, e.g., the Internet, and then at the remote server present the user with a website that would allow the user to register either manually or automatically the select media storage device. During the registration process, the website will prompt the user to provide at least one identifier including but not limited to the user's name, address, phone number, e-mail address, age, gender and entertainment preferences. The unique unit identifier will be associated with the user information and may be transmitted to the remote server by the verification module or by the user computer processor assembly after it has been retrieved from memory. Once registered, the publisher or distributor of the media storage device would be allowed to offer the user content related to the select media storage device and/or even offer to replace the media storage device should it become defective, via the unique unit identifier. Furthermore, the publisher or distributor of the media storage device would be allowed to offer the user other content based on the identifier provided by the user, e.g., content based on the age of the user. It is also noted, that the user will preferably be able to access information regarding their reward credit accumulation and/or media storage registration, such as through the use of a user identifier and accessing the website of the publisher or distributor or an associated processor containing the information. Alternatively, the user may be notified of the registration and any other rewards or supplemental content for the registration at their local user computer processor assembly, e.g., via an e-mail message.

Also, the reward credits may be applied in association with certain entities or associations, such as a specific record label, movie studio, game company, etc., such that a user may accumulate different types of reward credits, and may accumulate or increase reward credits of a certain nature only by validating an appropriately affiliated media storage device. Accordingly, there may be an incentive to buy specific types of content or media storage devices to increase the accumulated reward credit or further an incentive to register the media storage device.

As a further incentive to prevent the copying of a media storage device, the verification module 40 will also preferably be structured to identify and monitor subsequent validation requests in connection with a previously validated media storage device. In this regard, a validation attempt for the same physical media storage device and/or of another media storage device with the same content and the same unique unit identifier associated therewith will be considered a subsequent validation request of the select media storage device. When such a subsequent validation request is sought, however, and the verification module receives user information for a subsequent user in connection with the subsequent verification request, the verification module 40 is structured to remove any unused portion of an issued reward credit or registration from the first user. As a result, if a legitimate purchaser and therefore the first user of a selected media storage device provides their media storage device to a third party for inappropriate copying and/or inappropriately copies for a third party, they risk losing the reward credit or user registration if a subsequent user of that copied media storage device attempts validation thereof. Of course, a subsequent validation request by the same user will preferably not result in an additional value or point type reward credit being issued.

Looking to a further embodiment of the media validation system 10 of the present invention, the reward credit to be provided to the first user may also include the providing of access to supplemental content. This access to the supplemental content, which can be provided in addition to or instead of a point or other value type of credit, is preferably provided so as to achieve a further incentive to purchase a media storage device and obtain the necessary validation. In this regard, the supplemental content may include, in whole or in part, supplemental content 45' that is contained directly on the media storage device, but is, however, maintained in an encrypted and/or otherwise concealed format that is not readily accessible to the user absent validation with the verification module 40. Of course, any conventional means of encryption, encoding, concealment, etc. including those which require writing to the media storage device itself and/or which provide an encoded file and allow access to the supplemental content 45' in connection with a specific user computer processor assembly that contains a key, may be provided. Nevertheless, in any such embodiment, the verification module 40 is preferably structure to validate the selected media storage device and through this validation provide access to the supplemental content, such as upon receipt of the user information in association with the specific unique unit identifier for the select media storage device. If desired, the validation of the select media storage device by the verification module 40 may be achieved in a manner which requires validation each time access to the supplemental content is sought, and/or may be achieved in association with a specific user computer processor assembly such that subsequent access to the supplemental content in connection with the user computer processor assembly does not require re-validation. For example, in an embodiment where the unique unit identifier is stored in memory of the user computer processor assembly, the user computer processor assembly may transmit the unique unit identifier to a remote website including the supplemental content to allow access without re-validation or, the verification module will simply access the memory of the user computer processor assembly to obtain the unique unit identifier with the need to access the media storage device. Nevertheless, in a preferred illustrated embodiment the verification module is preferably structure to only validate the select media storage device for the first user that seeks validation of the select media storage device, and upon the receipt of user information associated with a subsequent user, will preferably un-validate the selected media storage device. As such, further, future access to the supplemental content that requires validation is prevented. For example, in an embodiment wherein validation is required for each access to the supplemental content, un-validation may merely include a notation by the verification module 40 whereby when a future validation is sought for the select media storage device, even by the first user once again, the steps necessary for validation and allowing access to the supplemental content are not performed. In the case of a semi-permanent type of validation, such as in connection with the specific user computer processor assembly, the un-validation may include a removal and/or deactivation of a facility on the user computer processor assembly that allows subsequent access to the supplemental content. In this regard, the verification module 40 may check for any necessary un-validations on a specific user computer processor assembly in connection with a particular user when they attempt to achieve future validations of other selected media storage devices. Alternatively, a timed re-verification of the validation facilities that are put in place on a specific user computer processor assembly may be required such that after a selected period of time, if verification is not achieved such as due to the un-validation by the verification module 40, future access to the supplemental content cannot be obtained. As a result, an original purchaser of the media storage device will be provided with a disincentive to allow others to copy their medias storage device, as that could restrict their future access to the supplemental content, and indeed other users will have an incentive to purchase their own media storage device, as that will be the only way they will be able to access the supplemental content. It is also noted in this and other embodiments that the validation and/or re-validation may merely include the identification of portions of the user information, such as a user name, in connection with the unique unit identifier, and/or another more complex and/or secure validation process that associates the user with the specific media storage device.

Looking to yet another embodiment illustrated in the Figures, the supplemental content which comprises all or a part of the reward credit may be maintained completely or partially remote from the select media storage device. This may include supplemental content that is to be downloaded to the user computer processor assembly, and/or as in the Figures may include supplemental content 45 in the form of alternative web sites and/or services that can be accessed either via the verification module 40, as in FIG. 1, and/or directly or via the communicative link. In particular, the supplemental content 45 may include a variety of different value added services and products, including previews of other content, registration of the select media storage device for the purposes of media storage replacement, interaction with other users of similar media storage devices containing the same or related content, games, contests, interactive viewings and/or question and answer sections with parties associated with the content on the media storage device, etc. Indeed, the variety of different types of supplemental content which may be offered in association with the select media storage device 20 may be rather large, and all function to provide a substantial incentive to purchase the media storage device to gain access to this supplemental content.

In such an embodiment wherein the supplemental content 45 is remote from the selected media storage device 20, the verification module 40 is structured to limit access to all or part of the supplemental content unless the select media storage device is validated or registered, such as through identification of the user information and unique unit identifier. Moreover, the verification module is preferably structured to validate only a first user who's user information is obtained in association with the select media storage device and its unique unit identifier. Also, in such an embodiment, access to the supplemental content 45 may be achieved by the first user either in connection with the use and access of the select media storage device and/or independently, from any computer processor assembly, with or without the use of the select media storage device. The verification module 40, by identifying the first user, such as utilizing the user information and/or any additional user information and/or password, etc. which may be set for that first user can effectively regulate initial and later access to the supplemental content 45, either directly and/or indirectly by providing the necessary information and/or control to the operators and/or managers of the supplemental content 45. Additionally, however, the verification module 40 is structured to un-validate a select media storage device having a specific unique unit identifier, and thereby limit access to the supplemental content 45 upon receipt of user information for a subsequent user in connection with that select media storage device, which is indicative of a further validation request. For example, if a copy of a media storage device is made, and a subsequent user seeks access to the supplemental content, and thereby seeks validation of the select media storage device by the validation/verification module 40, the verification module 40, by appropriately correlating the unique unit identifier for the select media storage device with the user information can effectively determine if a prior validation has already been achieved for the first user. Validation so as to allow access to the supplemental content 45 by the subsequent user, as well as possibly the first user during a future access, can therefore be denied to that supplemental user. Of course, if desired in this and all other embodiments, the validation/verification module 40 may be programmed such that more than merely the first user can achieve validation, however, within the context of the present invention, it is preferably only the first user which can effectively receive a reward credit.

As with the other embodiments of the present invention, when the supplemental content is available at least partially remotely from the select media storage device, the verification module 40 is preferably structured to un-validate the select media storage device having a specific unique unit identifier upon an attempted validation by a subsequent user. This un-validation will preferably function to prevent future access to the supplemental content by any user in connection with the select media storage device having the unique unit identifier, even preferably the first user. As a result, a substantial disincentive is provided to the first user to prevent them from allowing copies of their select media storage device, as that may, in the future, limit their access to the supplemental content. Moreover, also in the preferred embodiment, so as to prevent the submission of common user information, and therefore the false designation of multiple users as the same first user, the verification module 40 may be further structured to un-validate the select media storage device having the unique unit identifier if more than one user is accessing or attempts to access any or select portions of the supplemental content in association with the same select media storage device having the unique unit identifier. As a result, in an embodiment wherein multiple users provide the same user information to gain access to the supplemental content in association with the same select media storage device, un-validation of the select media storage device, and therefore, a restriction to future access to the supplemental content is achieved. Accordingly, a user who allows copying of their select media storage device will risk the loss of the access to the supplemental content if another user, utilizing a copied version of their select media storage device also accesses it the supplemental content. Indeed, as a further safe guard the verification module 40 may also be configured so as to un-validate, and possibly require re-validation of a select media storage device having a specific unique unit identifier after a predetermined period of time and/or when supplemental content becomes out of date. This allows the use of time sensitive information as the supplemental content. If a less restricted un-validation is desired, the verification module 40 may be configured so as to un-validate the select media storage device having the unique unit identifier for only a predetermined period of time. Naturally, appropriate controls may be implemented such that errors and/or other inappropriate un-validations and/or validations can be modified and/or corrected by the validation/verification module. Moreover, the verification module, either directly and/or through interaction with the operators of the supplemental content 45 can maintain an effective, continuous update of users associated with a media storage devices having particular unique unit identifier to determined when un-validation is appropriate.

In further embodiments, the providers and distributors of the media storage device, and more particularly the content provided thereon, may allow access to the supplemental content to subsequent users, i.e. not the original purchaser, in exchange for registration of the subsequent user and/or identification information. As described above, when the verification module has determined that a subsequent user is attempting to either validate the select media storage device or access the supplemental content, the subsequent user will be redirected to a website of the provider or distributor where they will be prompted to register as a user. If the subsequent user registers with identification information, the provider or distributor will allow the subsequent user access to supplemental content. In addition to the supplemental content described above, the supplemental content may further include marketing materials such as image galleries, newsletters, official websites, sweepstakes and solicitations/ offers. Here, in exchange for granting access to the supplemental information, the provider or distributor of the content gains access to a larger number of users, i.e., potential purchasers. Furthermore, the verification module may require validation of the subsequent user during the registration process to ensure the marketing materials are reaching the intended user, for example, through the use of e-mail validation as is known in the art.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A media validation system comprising:
 a plurality of media storage devices, each of said media storage device structured to contain a quantity of complete content thereon and a unique unit identifier;
 a user computer processor assembly, said user computer processor assembly structured to operatively access a select one of said media storage devices;
 a verification module coupled by a communicative link to the user computer processor assembly, said verification module structured to identify said unique unit identifier of said select media storage device to validate said select media storage device, wherein upon validation, said verification module directs said user computer processor assembly to a remote server;

said verification module further structured to receive user information associated with said select media storage device having said unique unit identifier and to maintain said user information in association with said unique unit identifier for said select media storage device; and said remote server structured to host a registration website, said registration website structured to give supplemental content related to said select media storage device in association with a first user to register said select media storage device with said user information.

2. A media validation system as recited in claim 1 wherein said supplemental content is maintained at least partially remote from said select media storage device.

3. A media validation system as recited in claim 1, where the registration of said select media storage device includes the user providing information to a remote server website including the user's name, address, phone number e-mail, age, gender, and entertainment preferences.

4. A media validation system as recited in claim 1 wherein after said select media storage device is validated and registered, the remote server website is structured to notify the user of the registration and any other rewards or supplemental content for the registration.

5. A media validation system as recited in claim 1 wherein after said select media storage device is validated and registered, the remote server website is structure to be accessed by the user to check on the registration status of the select media storage device.

6. A media validation system as recited in claim 1 wherein after said select media storage device is validated and registered, the remote server website is structure to be accessed by the user to register other media storage devices.

7. A media validation system as recited in claim 1 wherein said supplemental content includes marketing materials, image galleries, newsletters, official websites, sweepstakes, and solicitation/offers.

8. A media validation system as recited in claim 1 wherein said verification module is structured to validate said select media storage device in association with said user computer processor assembly such that subsequent access to said supplemental content utilizing said user computer assembly does not require re-validation.

9. A media validation system as recited in claim 8 wherein said user computer processor assembly is structured to utilize a cookie for the subsequent access which does not require re-validation.

10. A media validation system as recited in claim 1 wherein said verification module is structured to deny access to said supplemental content in association with said select media storage device upon receipt of user information for a subsequent different user in association with said select media storage device.

11. A media validation system as recited in claim 10 wherein said verification module is structured to direct the subsequent different user to the remote server for registration of the subsequent different user and, upon registration, to provide access to the supplemental content to the subsequent different user.

12. A media validation system as recited in claim 11 wherein said supplemental content includes marketing materials, image galleries, newsletters, official websites, sweepstakes, and solicitation/offers.

13. A media validation system as recited in claim 11 wherein the verification module is structured to validate the subsequent user registration.

14. A media validation system comprising:

a plurality of media storage devices, each of said media storage device structured to contain a quantity of complete content thereon and a unique unit identifier;

a user computer processor assembly, said user computer processor assembly structured to operatively access a select one of said media storage devices, read said unique unit identifier of said select media storage device unit and store said unique unit identifier into a memory of said user computer processor assembly;

a verification module coupled by a communicative link to the user computer processor assembly, said verification module structured to identify said unique unit identifier of said select media storage device to validate said select media storage device, wherein upon validation, said verification module directs said user computer processor assembly to a remote server;

said verification module further structured to receive user information associated with said select media storage device having said unique unit identifier and to maintain said user information in association with said unique unit identifier for said select media storage device; and said remote server structured to host a registration website, said registration website structured to give supplemental content related to said select media storage device in association with a first user to register said select media storage device with said user information.

15. A media validation system as recited in claim 14 wherein said verification module is structured to validate said select media storage device in association with said unique unit identifier stored in said memory of said user computer processor assembly such that subsequent access to said supplemental content utilizing said user computer assembly does not require re-validation.

16. A media validation system as recited in claim 14 wherein said user computer processor assembly is structured to transmit said unique unit identifier to a remote server to register said select media storage device.

* * * * *

UNITED STATES PATENT AND TRADEMARK OFFICE
CERTIFICATE OF CORRECTION

PATENT NO. : 7,318,061 B2 Page 1 of 1
APPLICATION NO. : 11/255844
DATED : January 8, 2008
INVENTOR(S) : Leigh M. Rothschild It is certified that error appears in the above-identified patent and that said Letters Patent is hereby corrected as shown below:

Col. 11, Claim 5, line 3, "structure" should be --structured--.

Col. 11, Claim 6, line 3, "structure" should be --structured--.

Signed and Sealed this

Twentieth Day of May, 2008

JON W. DUDAS
*Director of the United States Patent and Trademark Office*